No. 659,219. Patented Oct. 9, 1900.
J. H. FEDELER.
STEAM MOTOR.
(Application filed June 15, 1900.)
(No Model.) 2 Sheets—Sheet 1.
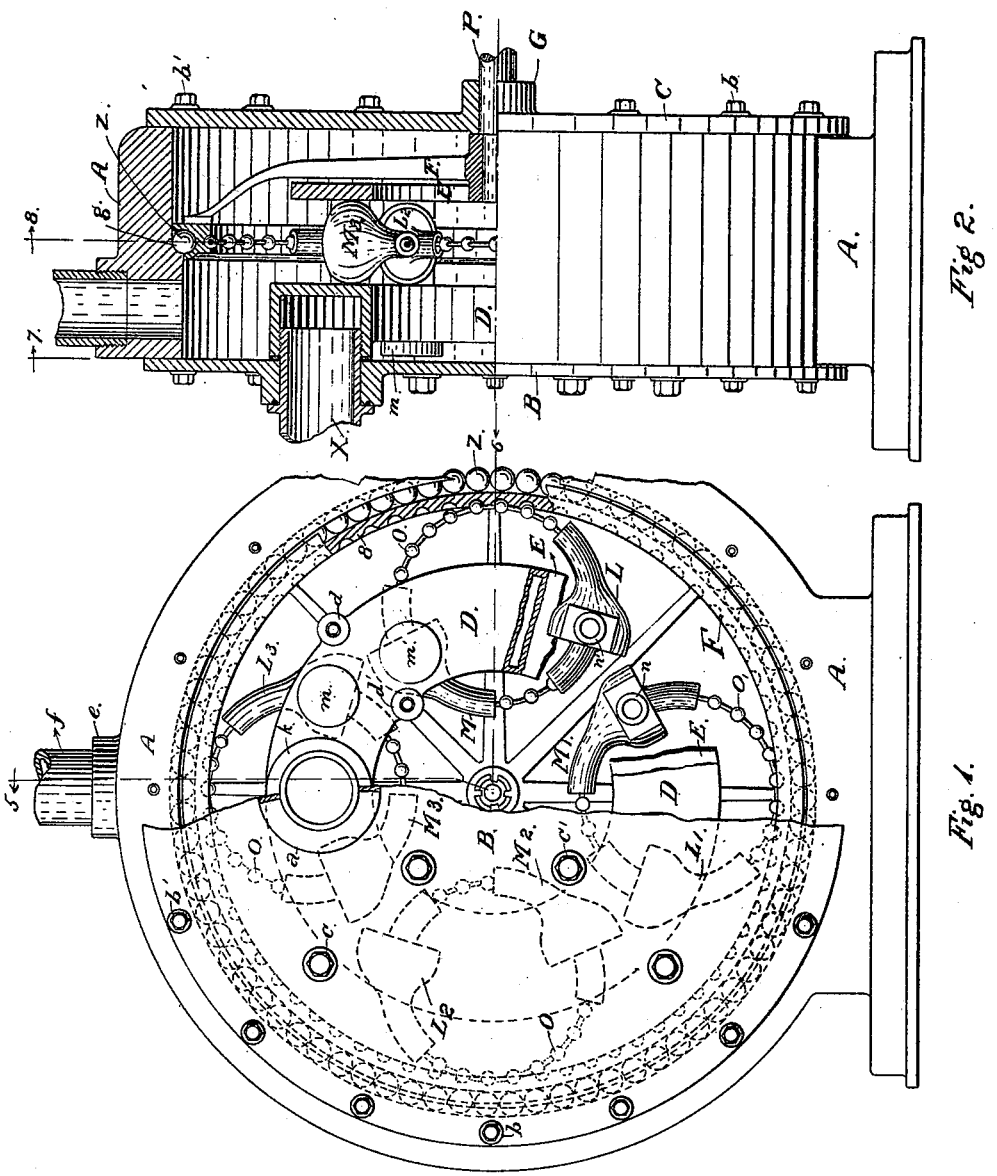
WITNESSES.
Thomas A. Edison Jr
H Wright M.E.
INVENTOR
John H Fedeler No. 659,219. Patented Oct. 9, 1900.
J. H. FEDELER.
STEAM MOTOR.
(Application filed June 15, 1900.)
(No Model.) 2 Sheets—Sheet 2.
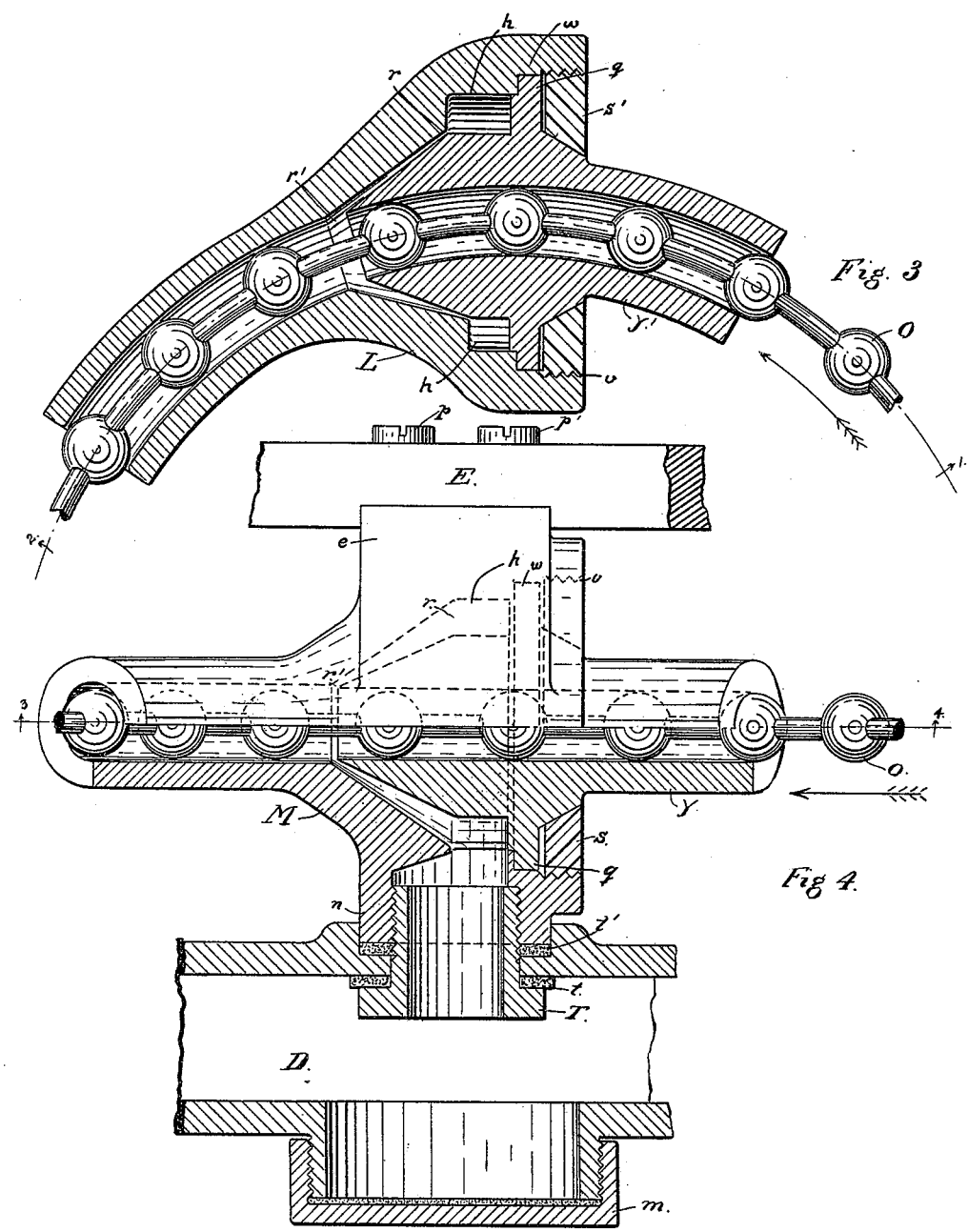
WITNESSES:
Thomas A. Edison Jr
H. Wright. M.E.
INVENTOR
John H Fedeler

UNITED STATES PATENT OFFICE.

JOHN H. FEDELER, OF NEW YORK, N. Y.

STEAM-MOTOR.

SPECIFICATION forming part of Letters Patent No. 659,219, dated October 9, 1900.

Application filed June 15, 1900. Serial No. 20,473. (No model.)

*To all whom it may concern:*

Be it known that I, JOHN H. FEDELER, a citizen of the United States, residing in the city, county, and State of New York, have invented a new and Improved Steam-Motor, of which the following is a full, clear, and exact description.

My invention relates to those motors called "turbines" and may be operated by steam, compressed air, hot air, and fluid or water.

This invention includes a novel combination of an outer casing, a wheel fitted steam-tight therein and fastened to the main shaft, one or more piston-rings adapted to revolve in combination with said wheel, a corresponding number of ejecting-rings, each composed of one or more ejectors, an induction and eduction port for each ejector, and pipe connections for admitting, distributing, and emitting the steam, air, or water used for operating the motor, all of which will be hereinafter more fully described.

The object of my invention is to provide a motor by which the molecular energy of steam, air, or water discharged from an orifice may be efficiently transferred to a shaft. I attain this object by the motor illustrated in the accompanying drawings, in which—

Figure 1 is a front view of the motor, part of the cover being removed on line 7 of Fig. 2 and a section of part of wheel on line 8 of Fig. 2. Fig. 2 is a side view of motor, upper half a section on line 5 6 of Fig. 1. Fig. 3 is a vertical section of an ejector on line 3 4 of Fig. 4. Fig. 4 is an inside view of an ejector, one half sectioned on line 1 2 of Fig. 3.

To bring out an object hereinafter more clearly explained, dimensions $r'$ and $r$, Fig. 3, have been inverted on Fig. 4.

The casing A, which constitutes the frame of the engine, is provided with a suitable base, upon which it rests, and an exhaust-pipe $f$. The cylindrical interior of casing A is provided with an offset $g$, and the object of which will be hereinafter explained. Each end of casing A is provided with a cover B and C, securely fastened to casing A by bolts $b\ b'$. Cover B is provided with holes for bolts $c\ c'$ and hub $a$, through which admitting-pipe $x$ passes. Cover C is provided with bearing G for shaft P. Inclosed within the casing a ring-shaped distributing-pipe D is securely fastened to cover B by means of bolts $c\ c'$, screwed into lugs $d\ d'$, provided for the purpose. Distributing-pipe D is furthermore provided with projection $k$ to connect with pipe $x$, hand-holes $m\ m'$, with covers, to facilitate connecting ejectors L M L' M' L² M² M³ M³, and openings opposite each hand-hole, through which nipples T pass, and the object of which will hereinafter be explained.

Ejectors L M L' M' L² M² L³ M³ consist of two pipes L and $y'$, Fig. 3, or M and $y$, Fig. 4. The center axes of these pipes form a straight line or arc, as the design may require. The inside of pipe L, Fig. 3, or M, Fig. 4, has one end enlarged, forming the lateral surface of the inside of a cone, with its vertex on the center axis of pipe and base, near the orifice. This end is provided with recess $h$, seat $w$, and thread $v$ on the inside, as shown in Figs. 3 and 4, and the object of which will hereinafter be explained, and boss $n$ and $e$ on the outside for the purpose of securing and connecting ejector in position to distributing-pipe D by means of nipple T, which also acts as connecting-pipe to ejectors and is therefore packed with suitable packing $t\ t'$ to brace E by means of bolts $p\ p'$. Brace E is a solid metal ring for the purpose set forth. The outside of pipe $y'$, Fig. 3, or pipe $y$, Fig. 4, has one end enlarged, forming the lateral surface of a cone, with its vertex a suitable distance from orifice on the center axis of pipe, its base a suitable distance near center of pipe, and is provided with flange $g$ to fit snug on seat $w$, heretofore referred to. Pipes L and $y$, Fig. 3, and M and $y$, Fig. 4, are securely held together by coupling-nut S and S'. Thus a space is formed between the slopes of pipe L and $y'$ or M and $y$, the object of which is to give the steam or water used as motive power a suitable direction and to form the envelop of a cone. Ejector shown in Fig. 3 is intended for steam or air. The space at $r'$ is larger than $r$ to allow for expansion before impact. Ejector as shown in Fig. 4 is intended for water. The space at $r'$ is smaller than $r$. The greatest resistance is thus offered immediately before impact. Along the center axes of ejectors the piston-ring O revolves and is composed of a suitably-shaped number of pistons or series of balls formed into an endless chain. Pistons or balls are adjusted to operate in conjunction with wheel F. Wheel F is connected to shaft P and is provided with grooves on the inside of rim for piston-rings O to fit in and on the outside of rim for balls Z, forming a bearing in groove $g$ of main casing, heretofore referred to.

The motor is operated as follows: The steam, air, or water passes from pipe X into distributing-pipe D, from distributing-pipe D into ejectors, imparting its energy by impact to piston-ring O, heretofore referred to, from ejectors into main casing A, and out through suitably-placed exhaust-pipe $f$, heretofore referred to. The energy thus imparted to piston-ring O is transferred to shaft P, as heretofore described.

A series of loose balls properly guided, forming an endless chain and adjusted to work in conjunction with wheel F, as heretofore described, shows that the speed of each ball increases as it approaches pipes $y\ y'$, Figs. 3 and 4. This proves that a partial vacuum is formed in pipes $y\ y'$, Figs. 3 and 4, thus helping to form a greater efficiency.

I am not aware that the combination of a chain of pistons or series of balls passing through and along the center line of an ejector, as heretofore described, has ever been patented. I therefore claim such combination broadly, and I desire to secure by Letters Patent—

1. The combination in a steam or water motor of one or more piston-rings or series of balls passing through and along the center line of one or more ejectors substantially as described and for the purpose set forth.

2. In a steam or water motor, the combination of; one or more ejectors; one or more piston-rings or series of balls with wheel F, substantially as described and for the purpose set forth.

3. In a steam or water motor, pipe M connected to pipe $y$ by nut S in combination with piston-ring or series of balls substantially as described and for the purpose set forth.

JOHN H. FEDELER.

Witnesses:
Thomas J. Courtenay,
W. D. Atkinson.